United States Patent
Latapie et al.

(10) Patent No.: US 11,687,798 B2
(45) Date of Patent: Jun. 27, 2023

(54) DYNAMIC HEURISTIC PACKAGES AND METRICS FOR NETWORK ASSURANCE USING A DEEP FUSION REASONING ENGINE

(71) Applicant: Cisco Technology, Inc., San Jose, CA (US)

(72) Inventors: Hugo Latapie, Long Beach, CA (US); Enzo Fenoglio, Issy-les-Moulineaux (FR); Carlos M. Pignataro, Cary, NC (US); Nagendra Kumar Nainar, Morrisville, NC (US); David Delano Ward, Somerset, WI (US)

(73) Assignee: Cisco Technology, Inc., San Jose, CA (US)

(*) Notice: Subject to any disclaimer, the term of this patent is extended or adjusted under 35 U.S.C. 154(b) by 485 days.

(21) Appl. No.: 16/811,823

(22) Filed: Mar. 6, 2020

(65) Prior Publication Data
US 2021/0279602 A1    Sep. 9, 2021

(51) Int. Cl.
*G06F 17/00* (2019.01)
*G06N 5/025* (2023.01)
*G06N 5/022* (2023.01)

(52) U.S. Cl.
CPC .............. *G06N 5/025* (2013.01); *G06N 5/022* (2013.01)

(58) Field of Classification Search
CPC ........ G06N 5/025; G06N 5/022; G06N 20/00; H04L 41/046; H04L 41/0806; H04L 41/142; H04L 41/145; H04L 41/5009; H04L 43/0829; H04L 43/087; H04L 43/10; H04L 43/16; H04L 43/0876
See application file for complete search history.

(56) References Cited

U.S. PATENT DOCUMENTS

| | | |
|---|---|---|
| 10,887,197 B2 | 1/2021 | Fenoglio et al. |
| 10,965,516 B2 | 3/2021 | Fenoglio et al. |
| 2013/0073486 A1* | 3/2013 | Petrick .................. H04L 41/22 706/12 |
| 2013/0272144 A1* | 10/2013 | Dong .................. H04L 43/024 370/252 |

(Continued)

OTHER PUBLICATIONS

Kashihara, Shuntaro, and Munefumi Tsurusawa. "Dynamic bandwidth management system using IP flow analysis for the QoS-assured network." 2010 IEEE Global Telecommunications Conference GLOBECOM 2010. IEEE, 2010 (Year: 2010).*

(Continued)

*Primary Examiner* — Andrew T McIntosh
(74) *Attorney, Agent, or Firm* — Behmke Innovation Group LLC; Kenneth J. Heywood; Jonathon P. Western

(57) ABSTRACT

In one embodiment, a deep fusion reasoning engine receives network telemetry data collected from a network. The deep fusion reasoning engine learns resource utilizations for different heuristic packages that can be used in the network to evaluate operation of the network. The deep fusion reasoning engine selects one of the heuristic packages based on the resource utilizations learned for the different heuristic packages. The selected heuristic package comprises a subservice and a set of rules to be evaluated. The deep fusion reasoning engine deploys the selected heuristic package for execution by a device in the network to evaluate operation of the network using the set of rules.

18 Claims, 11 Drawing Sheets

(56) References Cited

U.S. PATENT DOCUMENTS

| | | | |
|---|---|---|---|
| 2017/0055012 | A1* | 2/2017 | Phillips ................. H04L 65/612 |
| 2018/0145904 | A1* | 5/2018 | Alleman ................. H04L 63/30 |
| 2019/0238443 | A1 | 8/2019 | Di Pietro et al. |
| 2019/0280942 | A1 | 9/2019 | Cote et al. |
| 2019/0306011 | A1 | 10/2019 | Fenoglio et al. |
| 2019/0342195 | A1 | 11/2019 | Mermoud et al. |
| 2019/0356533 | A1 | 11/2019 | Vasseur et al. |
| 2020/0022016 | A1 | 1/2020 | Fenoglio et al. |
| 2021/0042532 | A1 | 2/2021 | Latapie et al. |
| 2021/0174155 | A1 | 6/2021 | Smith et al. |
| 2021/0279615 | A1 | 9/2021 | Latapie et al. |
| 2021/0390423 | A1 | 12/2021 | Latapie et al. |

OTHER PUBLICATIONS

Xie, Min, et al. "Service assurance architecture in NFV." 2017 IEEE Conference on Network Function Virtualization and Software Defined Networks (NFV-SDN). IEEE, 2017 (Year: 2017).*

Agrawal, et al., "VQA: Visual Question Answering", Proceedings of the IEEE International Conference on Computer Vision (ICCV), 2015, 25 pages, arXiv:1505.00468v7 [cs.CL].

Aleksander, Igor, "Machine consciousness" In Scholarpedia. 3(2):4162, Oct. 21, 2011, 7 pages.

Anderson, et al., "Bottom-Up and Top-Down Attention for Image Captioning and Visual Question Answering", 2018 IEEE/CVF Conference on Computer Vision and Pattern Recognition, Jun. 2018, pp. 6077-6086, IEEE, Salt Lake City, Utah.

Baudrillard, Jean, "Simulacra and Simulation", 1981, 159 pages, Galilee.

Baz, et al., "Context-aware hybrid classification system for fine-grained retail product recognition", 2016 IEEE 12th Image, Video, and Multidimensional Signal Processing Workshop (IVMSP), Jul. 2016, 5 pages, IEEE, Bordeaux, France.

Bĕlohlávek, Radim, "Concept lattices and order in fuzzy logic", Annals of Pure and Applied Logic 128 (2004) 277-298, Elsevier.

Box, G. E. P., "Science and Statistics", In Journal of the American Statistical Association, 71(356), Dec. 1976, pp. 791-799.

Chalmers, David J., "The Conscious Mind: In Search of a Fundamental Theory", 1996, 433 pages, Oxford University Press, New York.

Chella, et al., "A cognitive framework for imitation learning", Robotics and Autonomous Systems 54, Mar. 2006, pp. 403-408, Elsevier.

Chella, et al., "Artificial Consciousness", Chapter 20, In Perception-Action Cycle, 2011, pp. 637-671, Springer, New York.

Chella, et al., "Machine Consciousness: A Manifesto for Robotics", In International Journal of Machine Consciousness, 1(1), Jun. 2009, pp. 33-51, World Scientific Publishing Company.

Cohen, Paul R., "Projections as Concepts", Computer Science Department Faculty Publication Series (194), https://scholarworks.umass.edu/cs/_faculty/_pubs/194, 1997, 6 pages, University of Massachusetts, Amherst.

Cui, et al., "A survey on network embedding", IEEE Transactions on Knowledge and Data Engineering, vol. 31, Issue: 5, May 1, 2019, pp. 833-852, IEEE.

De Bono, Edward, "The Mechanism of Mind", 1967, 276 pages, Penguin Books.

Düntsch, et al., "Modal-style operators in qualitative data analysis", 2002 IEEE International Conference on Data Mining, 2002. Proceedings, Dec. 2002, pp. 155-162, IEEE, Maebashi City, Japan.

Franco, et al., "Grocery product detection and recognition", Expert Systems With Applications 81 (2017), pp. 163-176, Elsevier Ltd.

Gärdenfors, Peter, "Conceptual Spaces: The Geometry of Thought", 2000, 398 pages, MIT Press.

George, et al., "Recognizing Products: A Per-exemplar Multi-label Image Classification Approach", ECCV 2014, Part II, LNCS 8690, 2014, pp. 440-455, Springer International Publishing Switzerland.

Goertzel, et al., "CogPrime Architecture for Embodied Artificial General Intelligence", 2013 IEEE Symposium on Computational Intelligence for Human-like Intelligence (CIHLI), Apr. 2013, pp. 60-67, IEEE, Singapore.

Goertzel, Ben, "OpenCogPrime: A Cognitive Synergy Based Architecture for Artificial General Intelligence", 2009 8th IEEE International Conference on Cognitive Informatics, Jun. 2009, pp. 60-68, IEEE, Hong Kong, China.

Gorban, et al., "Blessing of dimensionality: mathematical foundations of the statistical physics of data", Philosophical Transactions of the Royal Society A: Mathematical, Physical and Engineering Sciences, 376.2118, Jan. 2008, 18 pages, The Royal Society Publishing.

Grover, et al., "node2vec: Scalable Feature Learning for Networks", KDD '16: Proceedings of the 22nd ACM SIGKDD International Conference on Knowledge Discovery and Data Mining, Aug. 2016, pp. 855-864, Association for Computing Machinery, New York, NY.

Hamilton, et al., "Representation Learning on Graphs: Methods and Applications", Bulletin of the IEEE Computer Society Technical Committee on Data Engineering, 2017, 23 pages, IEEE.

Hammer, et al., "A Reasoning Based Model for Anomaly Detection in the Smart City Domain", IntelliSys 2020, AISC 1251, pp. 144-159, 2021, Springer Nature Switzerland AG.

Hobbs, Jerry R., "Granularity", In Proceedings of the Ninth International Joint Conference on Artificial Intelligence, 1985, pp. 432-435, Morgan Kaufmann.

Horowitz, Alexandra, "Smelling themselves: Dogs investigate their own odours longer when modified in an "olfactory mirror" test", Behavioural Processes, 2017, 41 pages.

Johnson, Mark, "The Body in The Mind", 1987, 268 pages, The University of Chicago Press.

Kiryati, et al., "A probabilistic Hough transform", Pattern Recognition. 24(4), 1991, pp. 303-316, The Pattern Recognition Society.

Korzybski, Alfred, "Manhood Of Humanity, The Science and Art of Human Engineering", 1921, 240 pages, E. P. Dutton & Company, New York, NY.

Korzybski, Alfred, "Science and Sanity: An Introduction to Non-Aristotelian Systems and General Semantics", 5th Edition, 1994, 910 pages, Institute of General Semantics, New York, NY.

Korzybski, Alfred, "Videos—This Is Not That", online: https://www.thisisnotthat.com/korzybski-videos/, accessed Nov. 18, 2021, 7 pages.

Lakoff, G., "Women, Fire, and Dangerous Things", 1984, 631 pages, University of Chicago Press.

Latapie, et al., "A Metamodel and Framework for Artificial General Intelligence From Theory to Practice", Journal of Artificial Intelligence and Consciousness, Feb. 12, 2021, 1:30, 24 pages, World Scientific Publishing Company.

Li, et al., "Concept learning via granular computing: A cognitive viewpoint", Information Sciences 298 (2015), Published Dec. 2014, pp. 447-467, Elsevier Inc.

Lieto, et al., "Conceptual Spaces for Cognitive Architectures: A Lingua Franca for Different Levels of Representation", Biologically Inspired Cognitive Architectures 19, May 2017, 17 pages, Cognitive Robotics and Social Sensing Lab.

Ma, et al., "Granular computing and Dual Galois Connection", Information Sciences, 177(23), 2007, pp. 5365-5377, Elsevier Inc.

MacAulay, Thomas, "Facebook's chief AI scientist says GPT-3 is 'not a very good' Q&A system", online: https://thenextweb.com/news/facebooks-yann-lecun-says-gpt-3-is-not-very-good-as-a-qa-or-dialog-system, Oct. 28, 2020, accessed Nov. 18, 2021, 3 pages.

Murahari, et la., "Improving Generative Visual Dialog by Answering Diverse Questions", Proceedings of the 2019 Conference on Empirical Methods in Natural Language Processing and the 9th International Joint Conference on Natural Language Processing, Nov. 2018, pp. 1449-1454, Association for Computational Linguistics, Hong Kong, China.

Patel, et al., "Video Representation and Suspicious Event Detection Using Semantic Technologies", online: http://semantic-web-journal.net/system/files/swj2427.pdf, Semantic Web 0, Sep. 10, 2020, accessed Aug. 9, 2021, 25 pages, IOS Press.

(56) References Cited

OTHER PUBLICATIONS

Pauli, Wolfgang, "Part I. General: (A) theory. Some relations between electrochemical behaviour and the structure of colloids", Jan. 1935, pp. 11-27, Transactions of the Faraday Society, vol. 1.

Scarselli, et al., "The Graph Neural Network Model", IEEE Transactions on Neural Networks (vol. 20, Issue: 1, Jan. 2009), pp. 61-80, IEEE.

Searle, John R., "The Rediscovery of the Mind", 1992, 104 pages, MIT Press.

Speer, et al., "ConceptNet 5.5: An Open Multilingual Graph of General Knowledge", online: https://arxiv.org/pdf/1612.03975.pdf, 2017, 9 pagers, Association for the Advancement of Artificial Intelligence.

Swanson, Bret, "The Exponential Internet", online: https://www.uschamberfoundation.org/bhq/exponential-internet, accessed Nov. 19, 2021, 8 pages, The U.S. Chamber of Commerce Foundation.

Tan, et al., "EfficientDet: Scalable and Efficient Object Detection", online: https://arxiv.org/pdf/1911.09070.pdf, Jul. 2020, 10 pages.

Taylor, J. G., "CODAM: A neural network model of consciousness", Neural Networks 20 (2007), pp. 983-992, Elsevier Ltd.

Taylor, J. G., "William James on Consciousness Beyond the Margin", 1996, 231 pages, Princeton University Press.

Thórisson, et al., "Cumulative Learning", Artificial General Intelligence—12th International Conference, AGI 2019, Proceedings, pp. 198-208, Springer.

Thórisson, Kristinn R., "A New Constructivist AI: From Manual Methods to Self-Constructive Systems", Chapter 9, Apr. 2012, pp. 147-174, Atlantis Press Book.

Thórisson, Kristinn R., "Integrated AI Systems", Minds & Machines 17, Mar. 2007, pp. 11-25.

Tonioni, et al., "Product recognition in store shelves as a sub-graph isomorphism problem", online: https://arxiv.org/abs/1707.08378, Sep. 2017, 14 pages.

Unger, et al., "The Singular Universe and the Reality of Time: A Proposal in Natural Philosophy", 2015, 558 pages, Cambridge University Press.

Unger, R. M. 2014. "Roberto Unger: Free Classical Social Theory from Illusions of False Necessity", Online Lecture. 45 pages Retrieved on Nov. 22, 2021 from https://www.youtube.com/watch?v=yYOOwNRFTcY.

Wang, et al., "Concept Analysis via Rough Set and AFS Algebra", Information Sciences 178 (2008), pp. 4125-4137, Elsevier Inc.

Wang, Pei, "Experience-grounded semantics: a theory for intelligent systems", Aug. 2004, 33 pages, Elsevier Science.

Wang, Pei, "Insufficient Knowledge and Resources—A Biological Constraint and Its Functional Implications", Biologically Inspired Cognitive Architectures II: Papers from the AAAI Fall Symposium (FS-09-01), 2009, pp. 188-193, Association for the Advancement of Artificial Intelligence (www.aaai.org).

Wang, Pei, "Non-axiomatic logic (nal) specification", online: http://citeseerx.ist.psu.edu/viewdoc/download?doi=10.1.1.167.2069&rep=rep1&type=pdf, Oct. 2009, 88 pages.

Wang, Pei, "On Defining Artificial Intelligence", Journal of Artificial General Intelligence 10(2) 2019, pp. 1-37, Sciendo.

Wang, Pei, "Rigid Flexibility—The Logic of Intelligence", Draft for Comment, Feb. 8, 2004, 329 pages, mindspring.com.

Wang, et al. "Self in NARS, an AGI System", vol. 5, Article 20, Mar. 2018, 15 pages, Frontiers in Robotics and AI.

Wang, et al., "SuperGLUE: A Stickier Benchmark for General-Purpose Language Understanding Systems", online: https://arxiv.org/pdf/1905.00537.pdf, 2019, 29 pages, 33rd Conference on Neural Information Processing Systems (NeurIPS 2019), Vancouver, Canada.

Wikipedia, "Wheat and chessboard problem", online: https://en.wikipedia.org/wiki/Wheat_and_chessboard_problem, Oct. 2021, 5 pages, Wikimedia Foundation, Inc.

Wille, Rudolf, "Restructuring Lattice Theory: An Approach Based on Heirarchies of Concepts", I. Rival (Ed.), Ordered Sets, 1982, pp. 314-339.

Yao, et al., "A Granular Computing Paradigm for Concept Learning", Emerging Paradigms in Machine Learning, Springer, London, pp. 307-326, 2012.

Yao, Y. Y., "Information Granulation and Rough Set Approximation", International Journal of Intelligent Systems, vol. 16, No. 1, 87-104, 2001.

Yao, Y. Y., "Integrative levels of granularity", Human-Centric Information Processing Through Granular Modelling, 2009, 20 pages, Studies in Computational Intelligence, vol. 182. Springer, Berlin, Heidelberg.

Ying, et al., "Graph convolutional neural networks for web-scale recommender systems", online: https://arxiv.org/pdf/1806.01973.pdf, In KDD '18: The 24th ACM SIGKDD International Conference on Knowledge Discovery & Data Mining, Aug. 19-23, 2018, London, United Kingdom. ACM, New York, NY, USA, 10 pages.

Zhou, et al., "Graph neural networks: A review of methods and applications", AI Open, 2020, pp. 57-81, Elsevier B.V.

Zhu, et al., "Describing Unseen Videos via Multi-modal Cooperative Dialog Agents" Computer Vision—ECCV 2020, 17 pages, Lecture Notes in Computer Science, vol. 12368. Springer.

Asl, et al., "A New Approach on Multi-Agent Multi-Objective Reinforcement Learning Based on Agents' Preferences", 2017 Artificial Intelligence and Signal Processing Conference (AISP), Oct. 2017, 6 pages, Shiraz, Iran.

Chen, et al., "Knowledge-Embedded Representation Learning for Fine-Grained Image Recognition", online: https://www.ijcai.org/Proceedings/2018/0087.pdf, Proceedings of the Twenty-Seventh International Joint Conference on Artificial Intelligence (IJCAI-18), Jul. 2018, pp. 627-634.

Claise, et al., "Service Assurance for Intent-Based Networking Architecture", OPSAWG Internet Draft, draft-claise-opsawg-service-assurance-architecture-01, Nov. 2019, 14 pages, IETF Trust.

Critch, Andrew, "Toward Negotiable Reinforcement Learning: Shifting Priorities in Pareto Optimal Sequential Decision-Making", online: https://arxiv.org/pdf/1701.01302.pdf, May 2017, 19 pages.

Fei, et al., "Learning Cumulatively to Become More Knowledgeable", KDD '16: Proceedings of the 22nd ACM SIGKDD International Conference on Knowledge Discovery and Data Mining, Aug. 2016, pp. 1565-1574, ACM.

Hadfield-Menell, et al., "Cooperative Inverse Reinforcement Learning", online: https://arxiv.org/pdf/1606.03137.pdf, 30th Conference on Neural Information Processing Systems (NIPS 2016), Nov. 2016, 9 pages.

Hu, Ruiqi, "Learning and Representing Attributed Graphs", Thesis, University of Technology Sydney, 2018, 146 pages, Sydney, Australia.

Javed, et al., "Meta-Learning Representations for Continual Learning", online: https://arxiv.org/abs/1905.12588, 33rd Conference on Neural Information Processing Systems (NeurIPS 2019), Vancouver, Canada, May 2019, 15 pages.

Kozerawski, et al., "CLEAR: Cumulative LEARning for One-Shot One-Class Image Recognition", 2018 IEEE/CVF Conference on Computer Vision and Pattern Recognition, Jun. 2018, pp. 3446-3455, IEEE.

Malysheva, et al., "Deep Multi-Agent Reinforcement Learning with Relevance Graphs", online: https://arxiv.org/pdf/1811.12557.pdf, 32nd Conference on Neural Information Processing Systems (NIPS 2018), Nov. 2018, 10 pages.

Nguyen, Thanh Thi, "A Multi-Objective Deep reinforcement Learning Framework", online: https://arxiv.org/ftp/arxiv/papers/1803/1803.02965.pdf, Mar. 2018, 17 pages.

"Cumulative Learning", online: https://en.wikipedia.org/wiki/Cumulative_learing, printed Mar. 2020, 2 pages, WikiMedia Foundation, Inc.

"In-Memory Database", online: https://en/wikipedia.org/wiki/In-memory_database, printed Mar. 2020, 2 pages, Wikimedia Foundation, Inc.

"Redis", online: https://en/wikipedia.org/wiki/Redis, printed Mar. 2020, 5 pages, Wikimedia Foundation, Inc.

\* cited by examiner

DYNAMIC HEURISTIC PACKAGES AND METRICS FOR NETWORK ASSURANCE USING A DEEP FUSION REASONING ENGINE

TECHNICAL FIELD

The present disclosure relates generally to computer networks, and, more particularly, to dynamic heuristic packages and metrics for network assurance using a deep fusion reasoning engine.

BACKGROUND

Networks are large-scale distributed systems governed by complex dynamics and very large number of parameters. In general, network assurance involves applying analytics to captured network information, to assess the health of the network. For example, a network assurance service may track and assess metrics such as available the bandwidth, packet loss, jitter, and the like, to ensure that the experiences of users of the network are not impinged.

Typically, network assurance services rely on heuristic packages that include a set of rules and subservices, to monitor their networks. In other words, a heuristic package may specify the subservices and metrics to be monitored, as well as their associated monitoring rules (e.g., if metric X exceeds a defined threshold, do Y).

Unfortunately, heuristic packages today are static in nature and expert-defined. This means that a heuristic package often varies from network to network. In addition, changes to the network (e.g., deploying new equipment, configuration changes, etc.) may necessitate revision of the deployed heuristic package.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
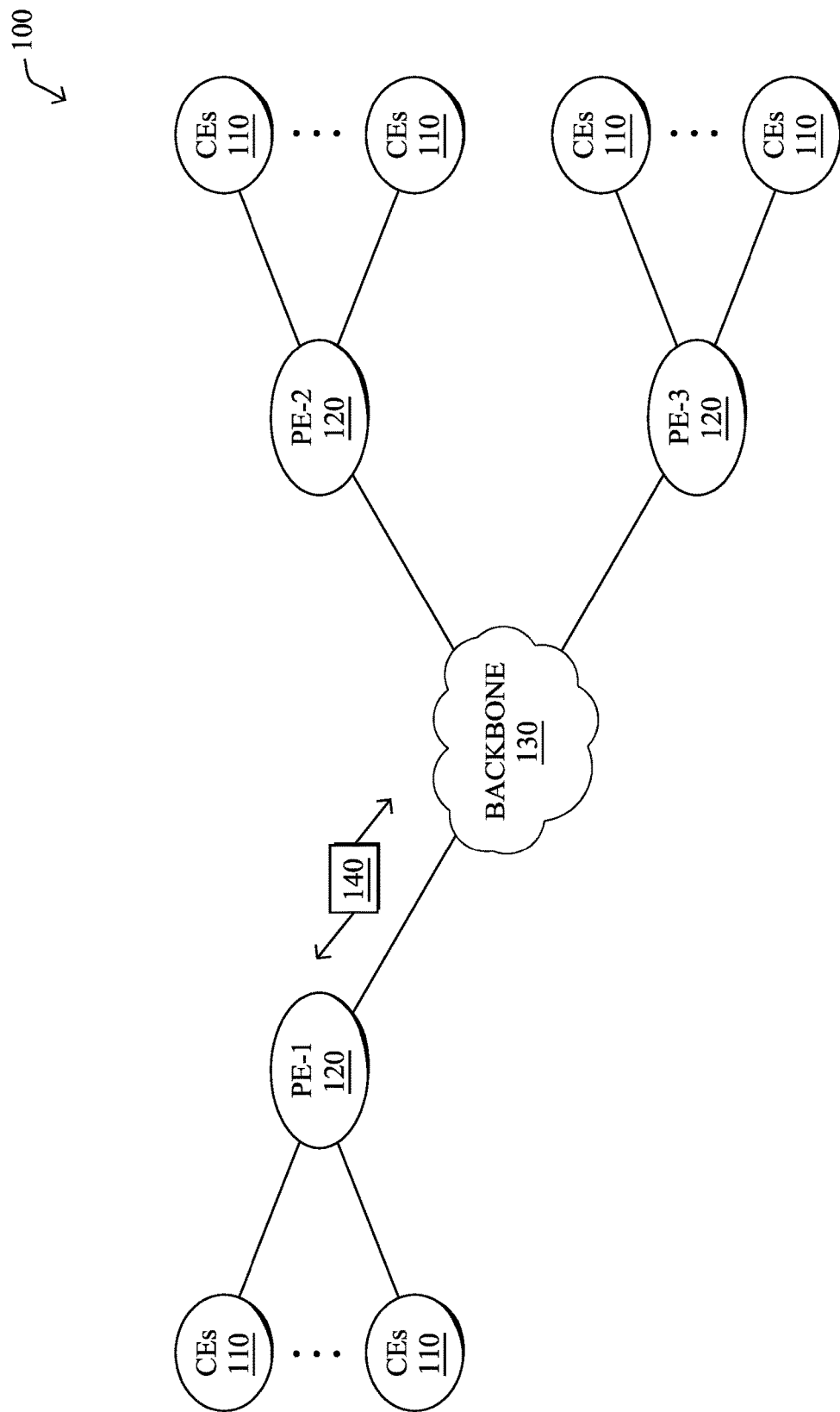
FIGS. 1A-1B illustrate an example computer network.

According to one or more embodiments of the disclosure, a deep fusion reasoning engine receives network telemetry data collected from a network. The deep fusion reasoning engine learns resource utilizations for different heuristic packages that can be used in the network to evaluate operation of the network. The deep fusion reasoning engine selects one of the heuristic packages based on the resource utilizations learned for the different heuristic packages. The selected heuristic package comprises a subservice and a set of rules to be evaluated. The deep fusion reasoning engine deploys the selected heuristic package for execution by a device in the network to evaluate operation of the network using the set of rules.

Description

A computer network is a geographically distributed collection of nodes interconnected by communication links and segments for transporting data between end nodes, such as personal computers, cellular phones, workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to forward data from one network to another.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN utilizing a Service Provider network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers) using a single CE router, with potentially a backup link (e.g., a 3G/4G/5G/LTE connection). A site of type B may itself be of different types:

2a.) Site Type B 1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
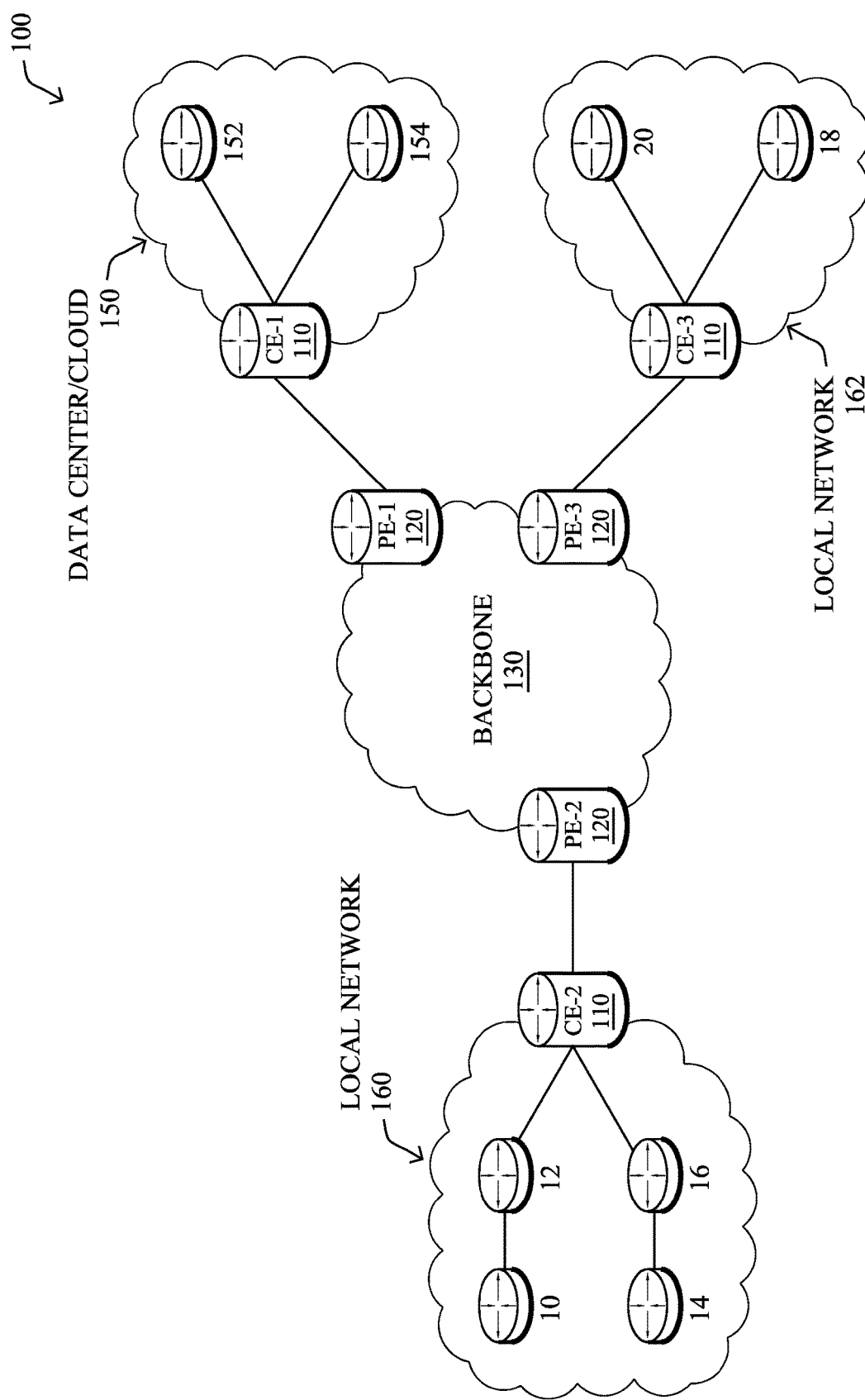

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often deployed on what are referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
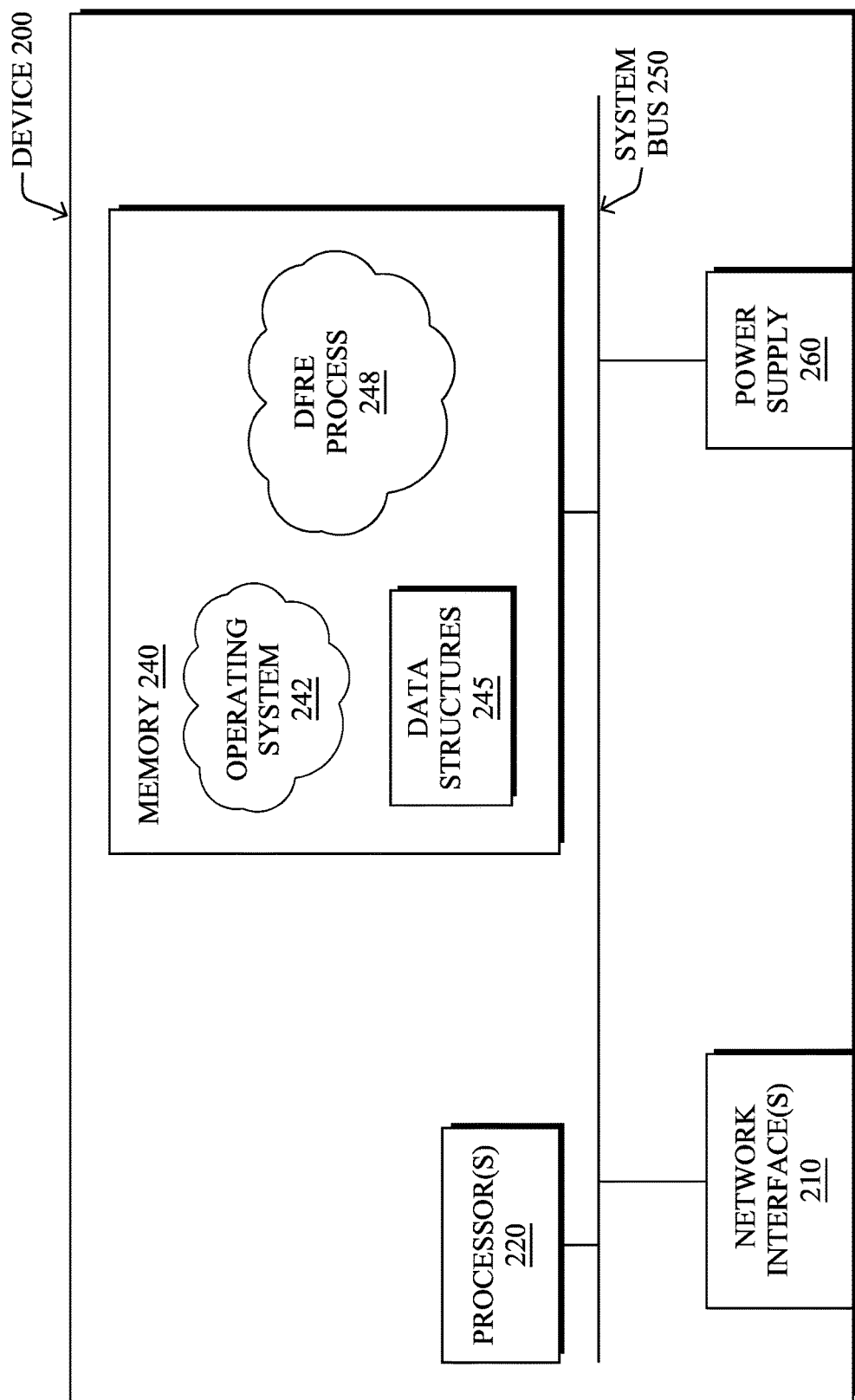
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a deep fusion reasoning engine (DFRE) process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

DFRE process 248 includes computer executable instructions that, when executed by processor(s) 220, cause device 200 to provide a network assurance service to a network. In various embodiments, DFRE process 248 may utilize machine learning techniques, in whole or in part, to perform its analysis functions. In general, machine learning is concerned with the design and the development of techniques that take as input empirical data (such as network statistics and performance indicators) and recognize complex patterns in these data. One very common pattern among machine learning techniques is the use of an underlying model M, whose hyper-parameters are optimized for minimizing the cost function associated to M, given the input data. The learning process then operates by adjusting the hyper-parameters such that the number of misclassified points is minimal. After this optimization phase (or learning phase), the model M can be used very easily to classify new data points. Often, M is a statistical model, and the minimization of the cost function is equivalent to the maximization of the likelihood function, given the input data.

In various embodiments, DFRE process 248 may employ one or more supervised, unsupervised, or self-supervised machine learning models. Generally, supervised learning entails the use of a training large set of data, as noted above, that is used to train the model to apply labels to the input data. For example, the training data may include sample network telemetry data indicative of normal or abnormal behavior and is labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Self-supervised is a representation learning approach that eliminates the pre-requisite requiring humans to label data. Self-supervised learning systems extract and use the naturally available relevant context and embedded metadata as supervisory signals. Self-supervised learning models take a middle ground approach: it is different from unsupervised learning as systems do not learn the inherent structure of data, and it is different from supervised learning as systems learn entirely without using explicitly-provided labels.

Example machine learning techniques that DFRE process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like. Accordingly, DFRE process 248 may employ deep learning, in some embodiments. Generally, deep learning is a subset of machine learning that employs ANNs with multiple layers, with a given layer extracting features or transforming the outputs of the prior layer.

The performance of a machine learning model can be evaluated in a number of ways based on the number of true positives, false positives, true negatives, and/or false negatives of the model. For example, the false positives of the model may refer to the number of times the model incorrectly identified a problem/issue in the monitored network. Conversely, the false negatives of the model may refer to the number of times the model failed to identify such a problem/issue. True negatives and positives may refer to the number of times the model correctly identified normal or problematic behavior in the network, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
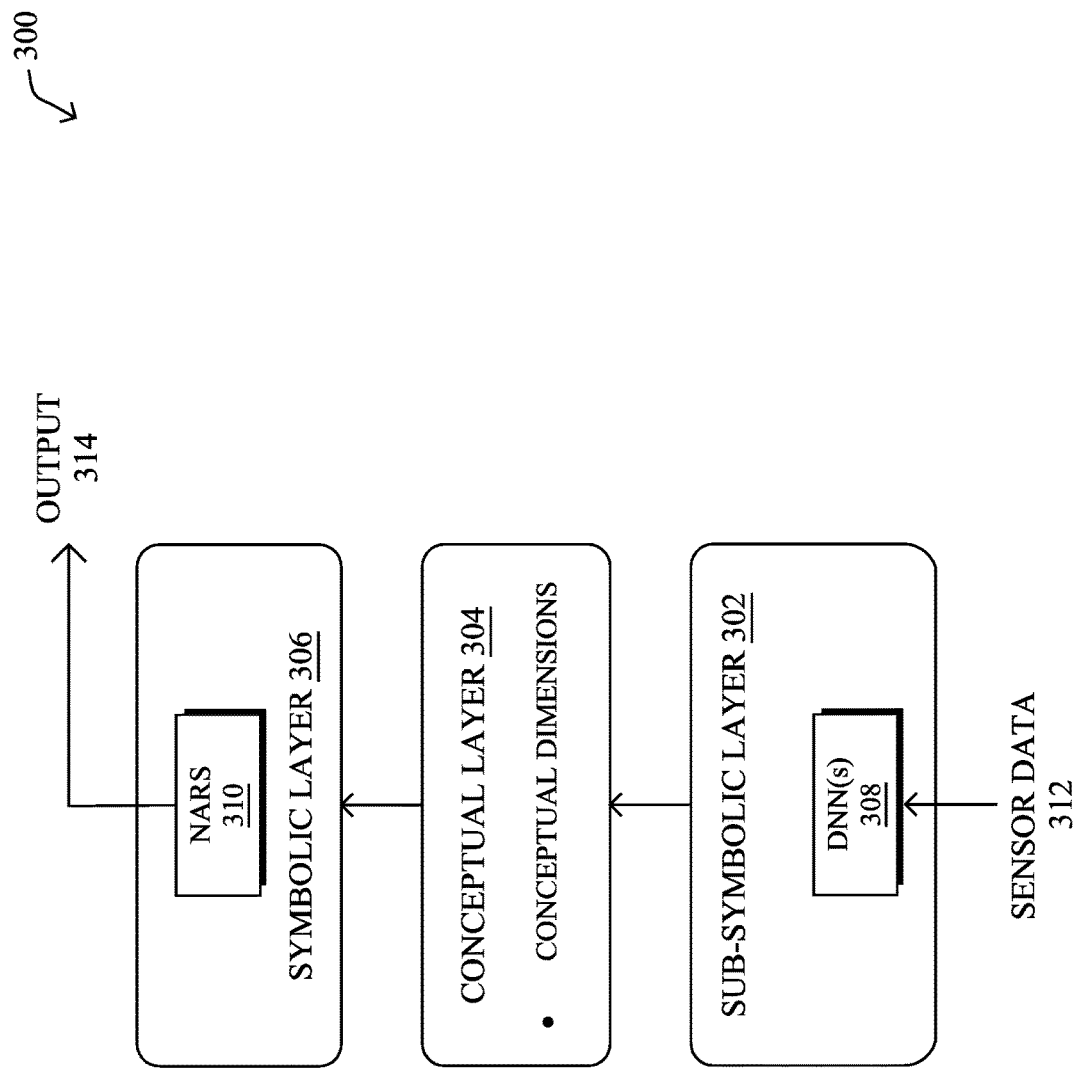
FIG. 3 illustrates an example layer hierarchy for a deep fusion reasoning engine (DFRE)

According to various embodiments, FIG. 3 illustrates an example layer hierarchy 300 for a deep fusion reasoning engine (DFRE). For example, DFRE process 248 shown in FIG. 2 may be implemented using layer hierarchy 300.

At the lowest layer of hierarchy 300 is sub-symbolic layer 302 that processes the sensor data 312 collected from the network. For example, sensor data 312 may include any number of telemetry measurements from the monitored network. In some embodiments, sensor data 312 may comprise multimodal sensor data from any number of different types of sensors located throughout the location. At the core of sub-symbolic layer 302 may be one or more DNNs 308 or other machine learning-based model that processes the collected sensor data 312. In other words, sub-symbolic layer 302 may perform sensor fusion on sensor data 312 to identify hidden relationships between the data.

At the opposing end of hierarchy 300 may be symbolic layer 306 that may leverage symbolic learning. In general, symbolic learning includes a set of symbolic grammar rules specifying the representation language of the system, a set of symbolic inference rules specifying the reasoning competence of the system, and a semantic theory containing the definitions of "meaning." This approach differs from other learning approaches that try to establish generalizations from facts as it is about reasoning and extracting knowledge from knowledge. It combines knowledge representations and reasoning to acquire and ground knowledge from observations in a non-axiomatic way. In other words, in sharp contrast to the sub-symbolic learning performed in layer 302, the symbolic learning and generalized intelligence performed at symbolic layer 306 requires a variety of reasoning and learning paradigms that more closely follows how humans learn and are able to explain why a particular conclusion was reached.

Symbolic learning models what are referred to as "concepts," which comprise a set of properties. Typically, these properties include an "intension" and an "extension," whereby the intension offers a symbolic way of identifying the extension of the concept. For example, consider the intension that represents motorcycles. The intension for this concept may be defined by properties such as "having two wheels" and "motorized," which can be used to identify the extension of the concept (e.g., whether a particular vehicle is a motorcycle).

Linking sub-symbolic layer 302 and symbolic layer 306 may be conceptual layer 304 that leverages conceptual spaces. In general, conceptual spaces are a proposed framework for knowledge representation by a cognitive system on the conceptual level that provides a natural way of representing similarities. Conceptual spaces enable the interaction between different type of data representations as an intermediate level between sub-symbolic and symbolic representations.

More formally, a conceptual space is a geometrical structure which is defined by a set of quality dimensions to allow for the measurement of semantic distances between instances of concepts and for the assignment of quality values to their quality dimensions, which correspond to the properties of the concepts. Thus, a point in a conceptual space S may be represented by an n-dimensional conceptual vector $v=<d_1, \ldots, d_i, \ldots, d_n>$ where $d_i$ represents the quality value for the $i^{th}$ quality dimension. For example, consider the concept of taste. A conceptual space for taste may include the following dimensions: sweet, sour, bitter, and salty, each of which may be its own dimension in the conceptual space. The taste of a given food can then be represented as a vector of these qualities in a given space (e.g., ice cream may fall farther along the sweet dimension than that of peanut butter, peanut butter may fall farther along the salty dimension than that of ice cream, etc.). By representing concepts within a geometric conceptual space, similarities can be compared in geometric terms, based on the Manhattan distance between domains or the Euclidean distance within a domain in the space. In addition, similar objects can be grouped into meaningful conceptual space regions through the application of clustering techniques, which extract concepts from data (e.g., observations).

Said differently, a conceptual space is a framework for representing information that models human-like reasoning to compose concepts using other existing concepts. Note that these representations are not competing with symbolic or associationistic representations. Rather, the three kinds can be seen as three levels of representations of cognition with different scales of resolution and complementary. Namely, a conceptual space is built up from geometrical representations based on a number of quality dimensions that complements the symbolic and deep learning models of symbolic layer 306 and sub-symbolic layer 302, representing an operational bridge between them. Each quality dimension may also include any number of attributes, which present other features of objects in a metric subspace based on their measured quality values. Here, similarity between concepts is just a matter of metric distance between them in the conceptual space in which they are embedded.

In other words, a conceptual space is a geometrical representation which allows the discovery of regions that are physically or functionally linked to each other and to abstract symbols used in symbolic layer 306, allowing for the discovery of correlations shared by the conceptual domains during concepts formation. For example, an alert prioritization module may use connectivity to directly acquire and evaluate alerts as evidence. Possible enhancements may include using volume of alerts and novelty of adjacent (spatially/temporally) alerts, to compute the semantic severity level of the alert.

In general, the conceptual space at conceptual layer 304 allows for the discovery of regions that are naturally linked to abstract symbols used in symbolic layer 306. The overall model is bi-directional as it is planned for predictions and action prescriptions depending on the data causing the activation in sub-symbolic layer 302.

Layer hierarchy 300 shown is particularly appealing when matched with the attention mechanism provided by a cognitive system that operates under the assumption of limited resources and time-constraints. For practical applications, the reasoning logic in symbolic layer 306 may be non-axiomatic and constructed around the assumption of insufficient knowledge and resources (AIKR). It may be implemented, for example, with a Non-Axiomatic Reasoning System (open-NARS) 310. However, other reasoning engines can also be used, such as Auto-catalytic Endogenous Reflective Architecture (AERA), OpenCog, and the like, in symbolic layer 306, in further embodiments. Even Prolog may be suitable, in some cases, to implement a reasoning engine in symbolic layer 306. In turn, an output 314 coming from symbolic layer 306 may be provided to a user interface (UI) for review. For example, output 314 may comprise a video feed/stream augmented with inferences or conclusions made by the DFRE, such as the locations of unstocked or under-stocked shelves, etc.

By way of example of symbolic reasoning, consider the ancient Greek syllogism: (1.) All men are mortal, (2.)

Socrates is a man, and (3.) therefore, Socrates is mortal. Depending on the formal language used for the symbolic reasoner, these statements can be represented as symbols of a term logic. For example, the first statement can be represented as "man→[mortal]" and the second statement can be represented as "{Socrates}→man." Thus, the relationship between terms can be used by the reasoner to make inferences and arrive at a conclusion (e.g., "Socrates is mortal"). Non-axiomatic reasoning systems (NARS) generally differ from more traditional axiomatic reasoners in that the former applies a truth value to each statement, based on the amount of evidence available and observations retrieved, while the latter relies on axioms that are treated as a baseline of truth from which inferences and conclusions can be made.

As noted above, network assurance typically relies on heuristic package that includes a set of rules and subservices to be monitored. In other words, a heuristic package may specify the subservices and metrics to be monitored, as well as their associated monitoring rules (e.g., if metric X exceeds a defined threshold, do Y). For example, a Bidirectional Forwarding Detection (BFD) subservice may send BFD probes along a network path, to measure a delay metric for the path. In turn, one or more rules can be applied to the delay metric, to determine whether the path can satisfy a service level agreement (SLA) associated with traffic along that path.

Unfortunately, heuristic packages today are static in nature, expert-defined, and consequently do not generalize well. This means that a heuristic package often varies from network to network. In addition, changes to the network (e.g., deploying new equipment, configuration changes, etc.) may necessitate revision of the deployed heuristic package.

Dynamic Heuristic Packages and Metrics for Network Assurance Using a DFRE

The techniques herein introduce a deep fusion reasoning engine (DFRE)-based architecture for dynamically adjusting the heuristic rules used to monitor a network based on behavioral/pattern learning and deriving/augmenting the metrics of the heuristic package.

Illustratively, the techniques described herein may be performed by hardware, software, and/or firmware, such as in accordance with the DFRE process 248, which may include computer executable instructions executed by the processor 220 (or independent processor of interfaces 210), to perform functions relating to the techniques described herein.

Specifically, in various embodiments, a deep fusion reasoning engine receives network telemetry data collected from a network. The deep fusion reasoning engine learns resource utilizations for different heuristic packages that can be used in the network to evaluate operation of the network. The deep fusion reasoning engine selects one of the heuristic packages based on the resource utilizations learned for the different heuristic packages. The selected heuristic package comprises a subservice and a set of rules to be evaluated. The deep fusion reasoning engine deploys the selected heuristic package for execution by a device in the network to evaluate operation of the network using the set of rules.

Figure 4:
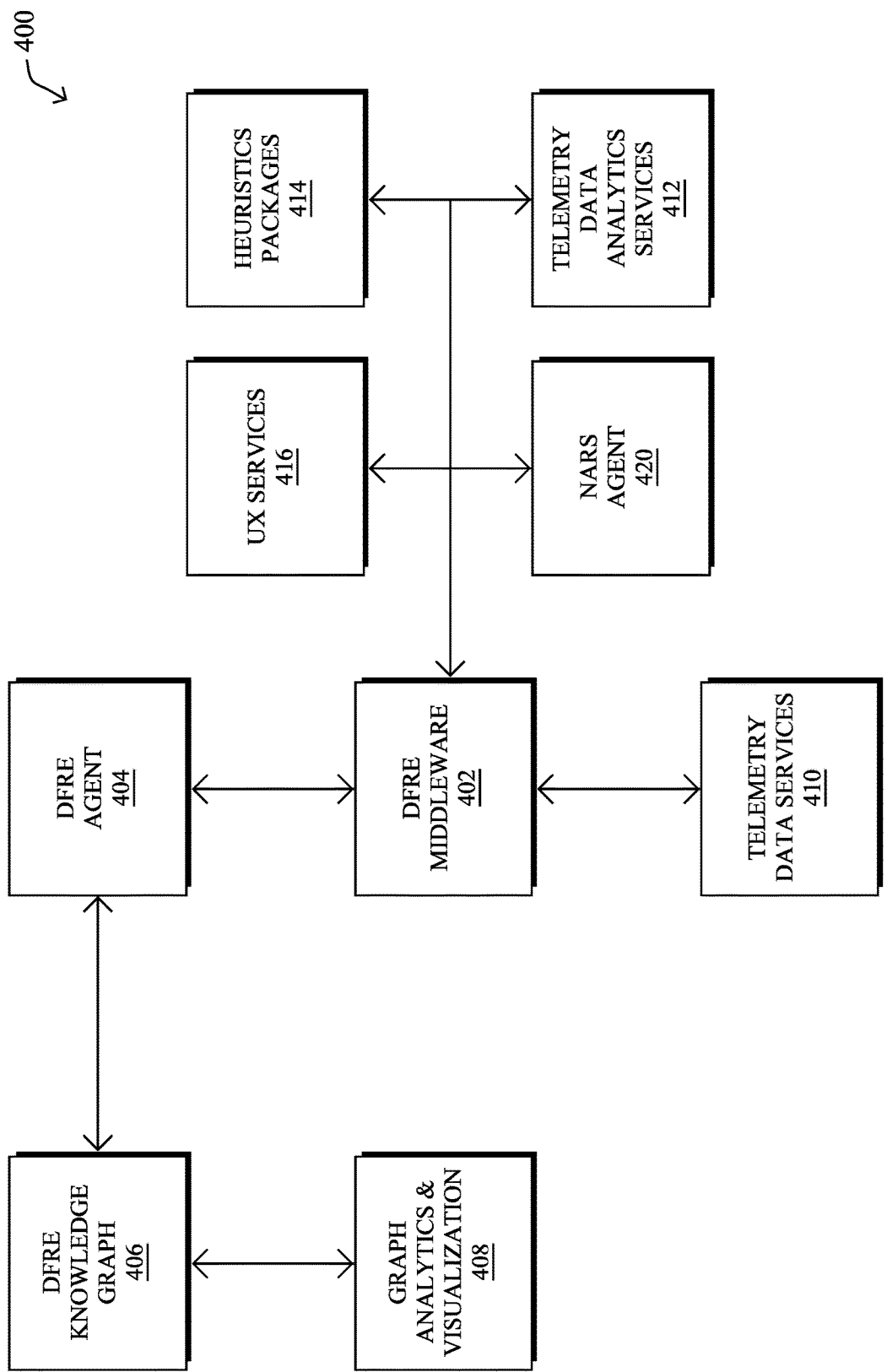
FIG. 4 illustrates an example DFRE architecture.

Operationally, FIG. 4 illustrates an example architecture 400 for implementing a DFRE as a service within a network, according to various embodiments. As would be appreciated, architecture 400 may be implemented across any number of devices, either in the network undergoing monitoring, partially at a remote location (e.g., in the cloud), or fully remote to the network.

At the core of architecture 400 may be DFRE middleware 402 that offers a collection of services, each of which may have its own interface. In general, DFRE middleware 402 may leverage a library for interfacing, configuring, and orchestrating each service of DFRE middleware 402.

In one embodiment, the services provided by DFRE middleware 402 may utilize telemetry data services 410, which are used to collect various forms of telemetry data from the network. For example, telemetry data services 410 may collect telemetry data regarding the network via probing, Netflow or IPFIX records, log information, model driven telemetry (MDT) and/or event-driven telemetry (e.g., Yang data), device information, or the like.

The services provided by DFRE middleware 402 may also include telemetry data analytics services 412, which perform analytics on the telemetry data collected by network telemetry data services 410. For example, telemetry data analytics services 412 may apply any number of predefined rules to the telemetry data gathered by telemetry data services 410. In some embodiments, services 412 may also use machine learning, to assess the collected telemetry data.

According to various embodiments, DFRE middleware 402 may also make use of any number of heuristic packages 414. As detailed further below, a heuristic package may comprise a set of evaluation rules and one or more subservices to be monitored in the network. More specifically, a heuristic package may indicate the subservices (e.g., subservices of telemetry data services 410) that are to be used to monitor specific metrics in the network. In addition, a heuristic package may also include the rules to be evaluated by telemetry data analytics services 412. For example, a particular rule may specify a threshold for a metric monitored by a subservice and may, in some cases, also specify a corresponding action (e.g., raising an alert, rerouting traffic, etc.).

DFRE middleware 402 may also provide user experience (UX) services 416, which may allow a user to report experienced network problems or the like. For example, if a user indicates a problem (e.g., a video conference keeps freezing), this may trigger the various components of architecture 400 to try and diagnose the problem.

In various embodiments, DFRE middleware 402 may also provide services to support semantic reasoning, such as by an AIKR reasoner. For example, as shown, DFRE middleware 402 may include a NARS agent 420 that performs semantic reasoning for structural learning. In other embodiments, OpenCog or another suitable AIKR semantic reasoner could be used.

One or more DFRE agents 404 may interface with DFRE middleware 402 to orchestrate the various services available from DFRE middleware 402. In addition, DFRE agent 404 may feed and interact with the AIKR reasoner so as to populate and leverage a DFRE knowledge graph 406 with knowledge. For example, DFRE agent 404 may perform semantic graph decomposition on DFRE knowledge graph 406, so as to compute a graph from knowledge graph 406 that addresses a particular problem. DFRE agent 404 may also perform post-processing on DFRE knowledge graph 406, such as performing graph cleanup, applying deterministic rules and logic to the graph, and the like. DFRE agent 404 may also employ a definition of done, to check goals and collect answers using DFRE knowledge graph 406.

In general, DFRE knowledge graph 406 may comprise any or all of the following:
Data
Ontologies
Evolutionary steps of reasoning Knowledge In other words, DFRE knowledge graph 406 acts as a dynamic and generic memory structure. In some embodiments, DFRE knowledge graph 406 may also allow different reasoners to share or coalesce knowledge, have their own internal sub-graphs, and/or work collaboratively in a distributed manner. For example, a first DFRE agent 404 may perform reasoning on a first sub-graph, a second DFRE agent 404 may perform reasoning on a second sub-graph, etc., to evaluate the health of the network and/or find solutions to any detected problems. To communicate with DFRE agent 404, DFRE knowledge base 406 may include a bidirectional Narsese interface or other interface using another suitable grammar.

In various embodiments, DFRE knowledge graph 406 can be visualized on a user interface via graph analytics and visualizations 408. For example, Cytoscape, which has its building blocks in bioinformatics and genomics, can be used to implement graph analytics and visualizations 408.

Figure 5:
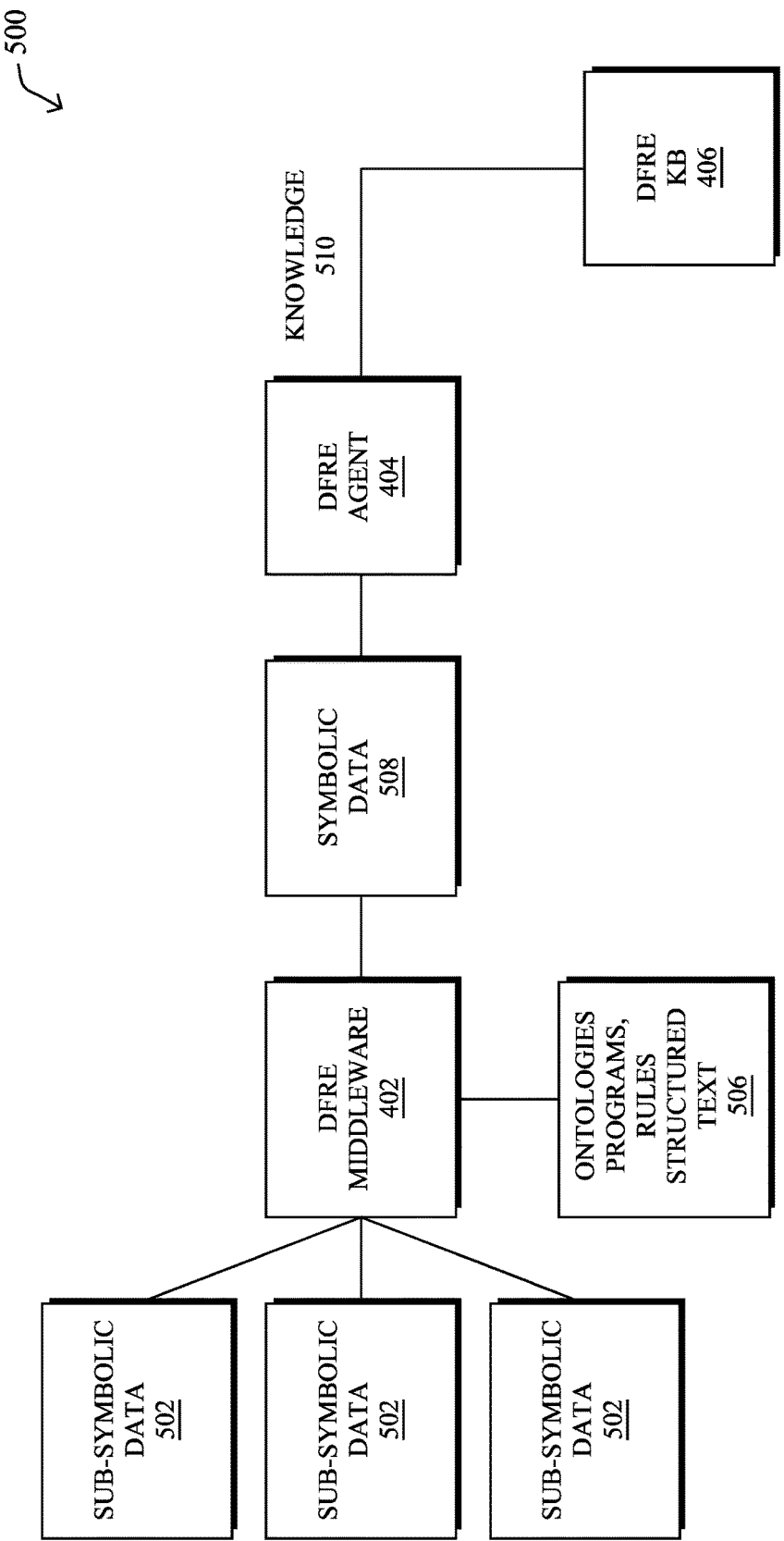
FIG. 5 illustrates an example of the interactions of the various components of the DFRE architecture.

FIG. 5 illustrates an example of the interactions of the various components of the DFRE architecture 400 of FIG. 4, according to various embodiments. As shown, sub-symbolic data 502 (e.g., various telemetry data metrics, statistics, etc.) can be captured by DFRE middleware 402 from the network. In turn, DFRE middleware 402 may leverage various ontologies, programs, rules, and/or structured text 506 to translate sub-symbolic data 502 into symbolic data 508.

DFRE agent 404 may apply symbolic reasoning to the symbolic data 508 provided by DFRE middleware 402, to populate and update DFRE knowledge base (KB) 408 with knowledge 510 regarding the network. In addition, DFRE agent 404 can leverage the stored knowledge 510 in DFRE KB 406 to make assessments about the network, such as selecting a heuristic package to deploy for use in the network.

Figure 6:
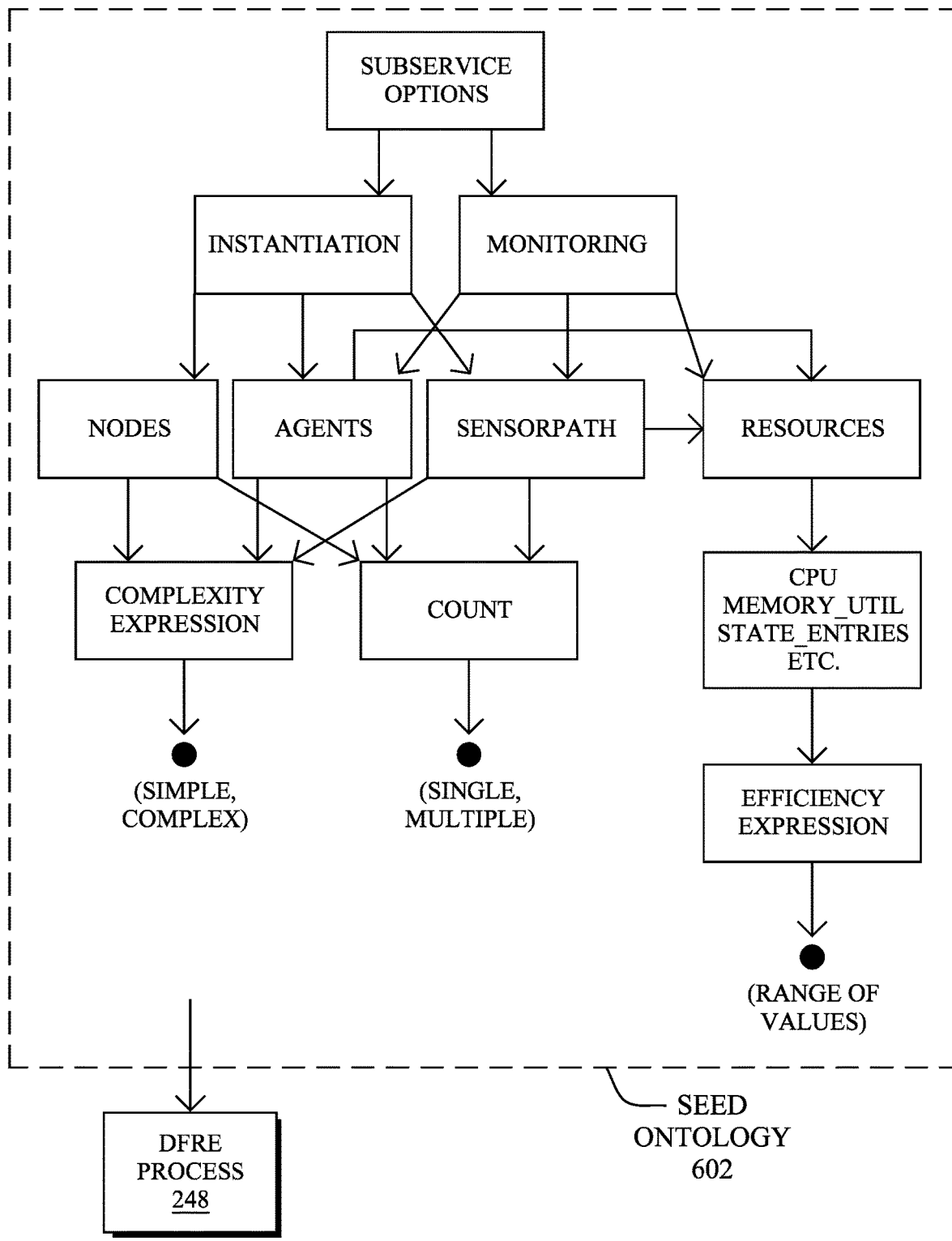
FIG. 6 illustrates an example seed ontology for a DFRE.

FIG. 6 illustrates an example seed ontology for a DFRE, according to various embodiments. As shown, seed ontology 602 may include various concepts, their relationships, functions, axioms/rules, and the like. For example, the concept of a subservice option (e.g., which subservices should be selected for a particular heuristic package) may be broken down into various concepts, such as 'monitoring' and 'instantiation.' From there, for instance, the monitoring concept may be related to a resources concept that, in turn, is related to the concept of specific resource measurements, such as CPU utilization, memory utilization, state entries, and the like. In turn, these metrics can be used to compute an efficiency expression that quantifies the efficiency of a particular subservice option (e.g., as a range of values, etc.).

Seed ontology 602 can be specified to DFRE process 248, to populate its knowledge graph. As would be appreciated, the seed ontology provides only a base framework for the knowledge graph and the knowledge graph will change over time as additional knowledge is acquired. For example, certain knowledge may be added to the knowledge graph over time, either in its own right or replacing older knowledge in the network. In other words, the DFRE process 248 may learn over time, as more data is collected from the network.

Figure 7:
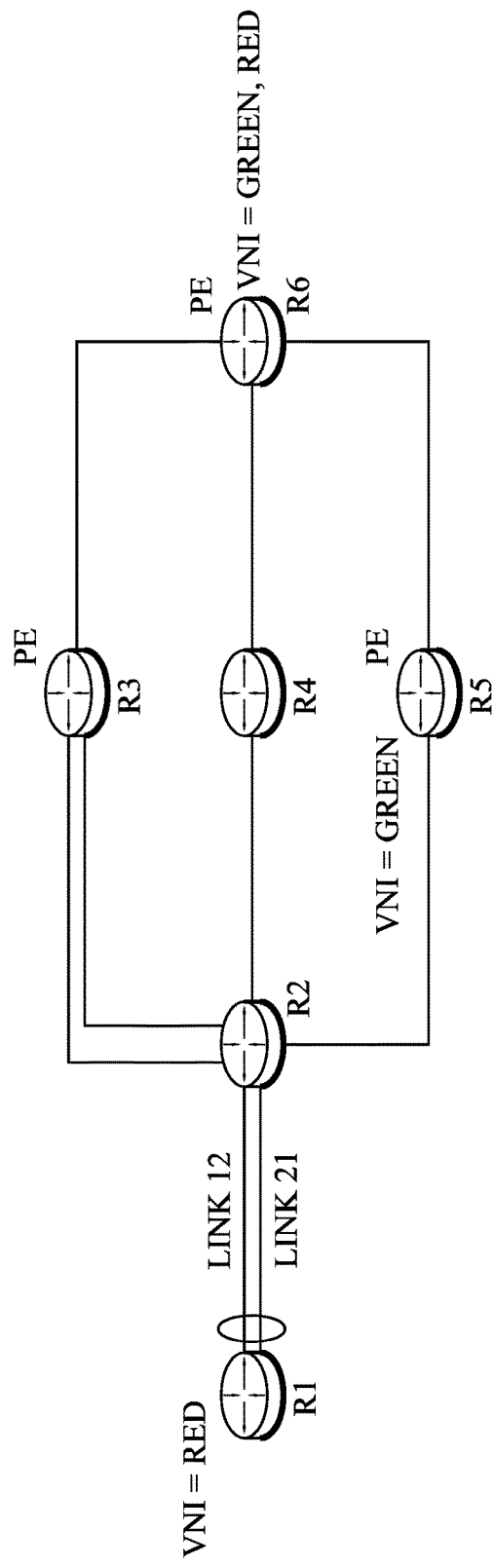
FIG. 7 illustrates an example network.
Figure 7:
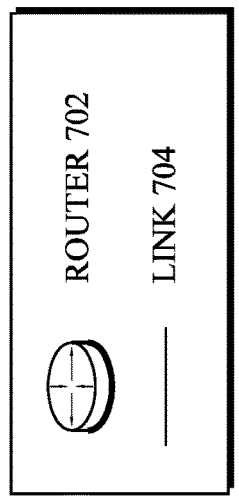

To better illustrate the teachings herein, FIG. 7 illustrates an example network 700. As shown, assume that network 700 includes a plurality of routers 702 that are interconnected by links 704. For example, assume that network 700 includes routers R1-R6 shown and are interconnected as shown. As would be appreciated, network 700 is shown for illustrative purposes only and may include any number of networking devices (e.g., routers, switches, etc.) of varying topologies.

More specifically, router R1 may be linked to router R2 via links $L_{12}$ and $L_{21}$. In turn, router R2 may share two links with router R3, a single link with router R4, and a single link with router R5. Each of routers R3-R5 may also share its own link with router R6. Thus, various paths are available in network 700 between router R1 and router R6, depending on the series of links 704 and routers 702 selected.

Assume now that Ethernet virtual private network (EVPN) functions are available between routers R1 and R6 for each possible path. In effect, EVPN bridges different Layer 2 domains across a backbone network. In other words, EVPN essentially creates a Layer 2 network overlay on top of the Layer 3 network. Each tenant at the Layer 3 level is associated with a unique virtual network identifier (VNI) that are used to segment/separate traffic in the network.

Further, assume that one of the subservices in network 700 is L3Connectivity, which operates to provide network assurance to the Layer 3 connectivity of network 700. In such a case, multiple subservice options are possible, to monitor and assess this connectivity:

1. Create multiple Bidirectional Forwarding Detection (BFD), Seamless BFD (SBFD), microBFD, or IP Service Level Agreements (IPLSA) sessions for each path between routers R1 and R6.
2. Monitor each link 704 and the status of each transit router 702.

Note that the decision to opt for either subservice option is highly dependent on the circumstances. Indeed, the number of links 704, the capabilities of routers 702, the number of service endpoints, and the like, can make one of the two options better than the other. Further factors that can also affect this decision may include, but are not limited to, any or all of the following:

The amount of needed to implement the subservice option
The number of devices (routers 702) to monitor
The amount of data to be monitored
The number of agents that would need to be deployed to perform the monitoring For example, assume that there are two equal cost multi-path (ECMP) paths between routers R1 and R6 that span over ten hops (dual plane). In this case, the first subservice option above may be more attractive, as only 2 BFD/IPSLA/etc. sessions are needed on R1/R6. In contrast, the second subservice option above will require monitoring a total of twenty nodes and links, including their statuses and other counters.

In various embodiments, the DFRE framework described above can be used to evaluate the various subservice options and deploy a corresponding heuristic package to the network. Typically, this will be performed as part of a closed-loop mechanism within the network, allowing the DFRE to update the deployed heuristic package dynamically.

Figure 8:
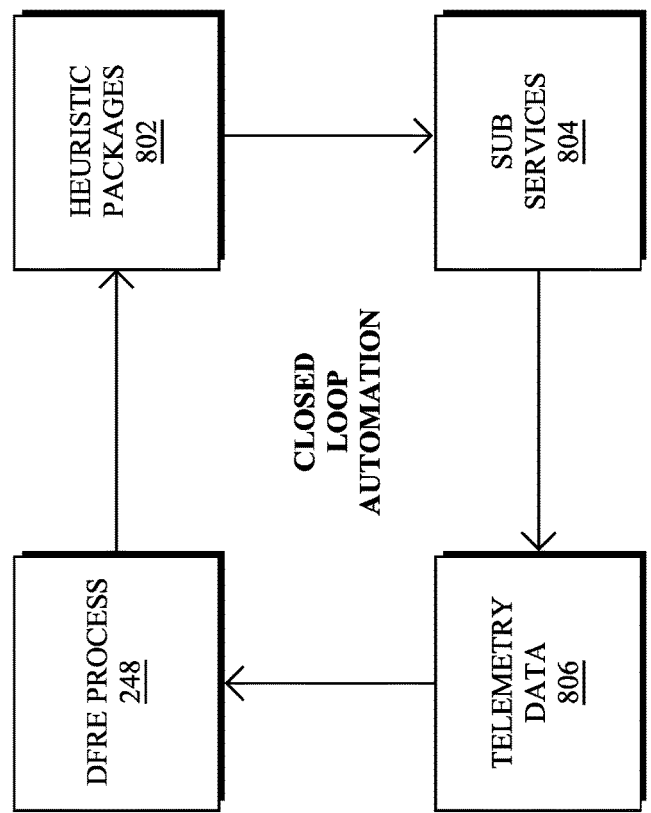
FIG. 8 illustrates an example closed loop automation mechanism for using a DFRE to dynamically select heuristic packages.

FIG. 8 illustrates an example closed loop automation mechanism 800 for using a DFRE to dynamically select heuristic packages, according to various embodiments. As shown, telemetry data 806 (e.g., sub-symbolic data collected from the network) may be provided to DFRE process 248. In turn, DFRE process 248 may convert telemetry data 806 into corresponding symbolic information, allowing it to apply its symbolic reasoner to the problem using its knowledge base and select an appropriate heuristic package 802 for deployment to the network.

Using the deployed heuristic packages 802, the corresponding subservices 804 may generate additional telemetry data 806 that is ingested by DFRE process 248. This allows the DFRE to continually monitor the conditions of the network and dynamically select and deploy heuristic packages 802 as needed. In doing so, static heuristic packages 802 do not need to be defined and deployed to the network, as the network changes.

In various embodiments, the reasoning engine of DFRE process 248 may employ any or all of the following reasoning rules, to select the most appropriate heuristic package 802:

deviceConfigRequired=={yes|no}
deviceConfigComplexity==(deviceCount, configImpact)/ *Less value is better*/
   deviceCount→Number of devices where sensorpath or other monitoring configuration changes are required to enable the heuristic package.
   ConfigImpact→Features, lines of configuration required on each device.
monitorComplexity==(deviceCount, MetricImpact)/ *Less value is better*/
   deviceCount→Number of devices from which sensorpath data are collected for monitoring.
   MetricImpact→Count of metrics required from each device.
agentEfficiency==(agentCount,)/*Less value is better*/
   agentCount→Number of agents required to receive/process the sensorpath data for the package.
resourceEfficiency==(utilMetricImpact)/*Less value is better*/
   utilMetricImpact→Impact on the resource utilization for each type of package.

In other words, DFRE process 248 may use its acquired knowledge about the network (e.g., as learned from telemetry data 806) to evaluate the above factors and select the 'best of breed' among the various subservice options available based on any or all of these factors. To do so, DFRE process 248 may initiate a goal search of the knowledge graph until a definition of done (DoD) condition is satisfied.

In turn, DFRE process 248 can select the heuristics package 804 that corresponds to the best option and deploy it to the network. For example, in a simple case, DFRE process 248 may simply select the heuristic package 804 that requires the least amount of resource utilization in the network. In more complex cases, DFRE process 248 may select the heuristic package 804 by balancing out the various factors, potentially weighting each factor, as desired.

Figure 9:
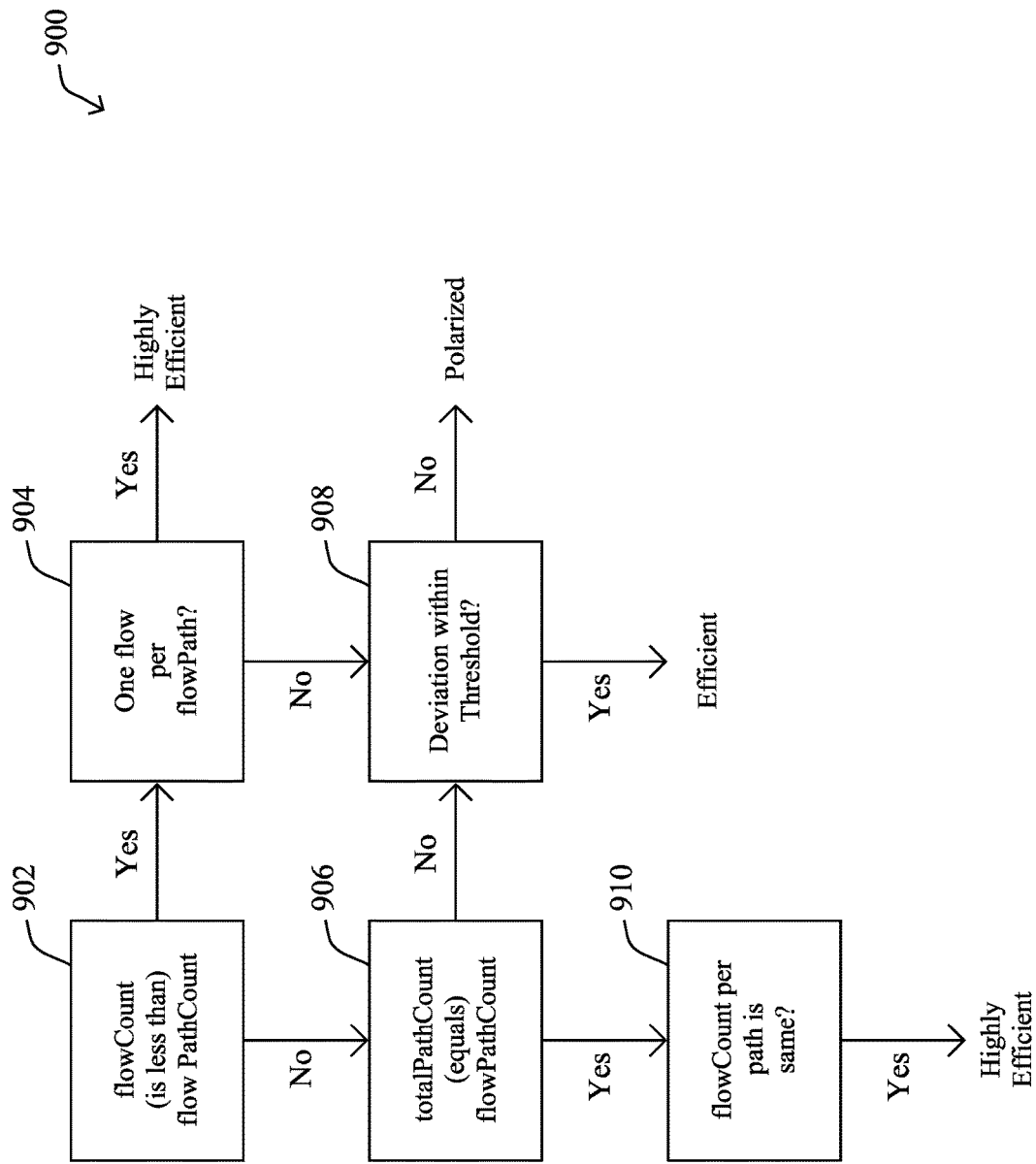
FIG. 9 illustrates an example of rules to evaluate ECMP in a network.

FIG. 9 illustrates an example 900 of rules to evaluate ECMP in a network, according to various embodiments. As would be appreciated, ECMP in a network can range from highly efficient to polarized, which may require corrective measures. As shown, various decision steps 902-910 can be evaluated, to determine whether the ECMP in the network can be categorized as 'highly efficient,' 'efficient,' or 'polarized.'

For example, if the flowCount metric is less than the flowPathCount metric (decision step 902) and there is only one flow per flowPath (decision step 904), then the ECMP in the network is 'highly efficient.' Similarly, if the flow-Count is not less than flowPathCount (decision step 902), but the totalPathCount equals the flowPathCount (decision step 906), and the flowCount per path is the same (decision step 910), then the ECMP in the network is also 'highly efficient.' Conversely, if the totalPathCount does not equal the flowPathCount (decision step 906) or there is not one flow per flowPath, then the deviations may be compared to a threshold (decision step 908). If the deviation is within the defined threshold, the ECMP in the network may be labeled as 'efficient.' However, if not, the ECMP in the network may be deemed 'polarized.'

As would be appreciated, the above examples are illustrative in nature and one skilled in the art can adapt the DFRE-based framework herein to assess any number of different scenarios.

Figure 10:
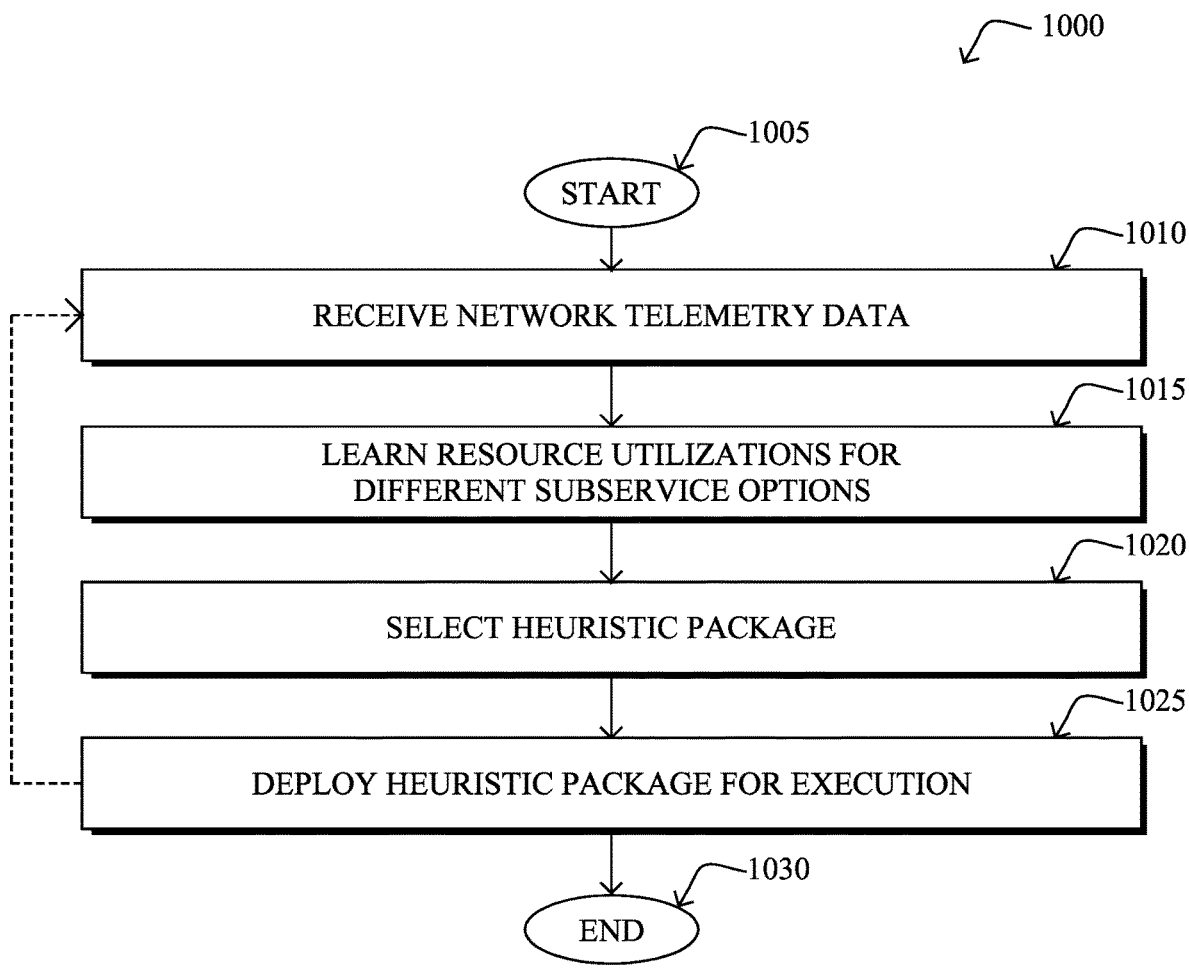
FIG. 10 illustrates an example simplified procedure for deploying a heuristic package to a network.

FIG. 10 illustrates an example simplified procedure 1000 for deploying a heuristic package to a network, according to various embodiments. In general, a DFRE, which may be provided by one or more devices (e.g., a device 200), may perform procedure 1000. As shown, procedure 1000 may start at step 1005 and continue on to step 1010 where, as described in greater detail above, the DFRE may receive network telemetry data. For example, such network telemetry data may be indicative of one or more device metrics (e.g., its CPU utilization, its memory utilization, its queue states, etc.), one or more link or path metrics (e.g., delay, jitter, packet loss, etc.), combinations thereof, or the like.

At step 1015, as detailed above, the DFRE may learn the resource utilizations for different heuristic packages that can be used in the network to evaluate operation of the network. In general, each heuristic package may comprise one or more subservices and a set of evaluation rules that can be used to evaluate the operation of the network. For example, one subservice may assess the Layer 3 connectivity in the network by establishing one or more probing sessions along a path using a specified monitoring protocol (e.g., BFD, IPSLA, etc.). Conversely, another option may be for the subservice to install agents onto the various devices along the path, to monitor their statuses and link states. Said differently, the different heuristic packages represent different approaches to monitoring a particular characteristic of the network (e.g., Layer 3 connectivity, ECMP, etc.). Thus, the DFRE may learn the resource requirements needed to implement each of the possible options for the subservice, with each option being represented by a different heuristic package.

At step 1020, the DFRE may select one of the heuristic packages based on the resource utilizations that it learned for the different heuristic packages, as described in greater detail above. In further embodiments, the DFRE may also base the selection on a number of devices to which the heuristic package should be deployed, whether such devices would require a configuration change, a configuration complexity, a monitoring complexity, or agent efficiency associated with the selected heuristic package, combinations thereof, or based on other factors. In various embodiments, the DFRE may leverage semantic reasoning, to select the 'best' heuristic package for deployment. To this end, the DFRE may be initiated with a seed ontology to populate its knowledge base.

At step 1025, as detailed above, the DFRE may deploy the selected heuristic package for execution by a device in the network, to evaluate the operation of the network using the set of rules in the package. In some embodiments, the DFRE may deploy the package to multiple devices in the network, such as when multiple devices are needed to assess a particular network characteristic. In further embodiments, the DFRE may also employ a closed-loop control mechanism by repeating steps 1010-1025 any number of times, thereby dynamically adjusting the heuristic packages over time. Procedure 1000 then ends at step 1030.

It should be noted that while certain steps within procedure 1000 may be optional as described above, the steps shown in FIG. 10 are merely examples for illustration, and certain other steps may be included or excluded as desired.

Further, while a particular order of the steps is shown, this ordering is merely illustrative, and any suitable arrangement of the steps may be utilized without departing from the scope of the embodiments herein.

Accordingly, a DFRE-based architecture is introduced that can be used to dynamically select and deploy heuristic packages for network assurance. By doing so, such packages need no longer be statically defined and require the manual intervention of a networking expert.

While there have been shown and described illustrative embodiments that provide for using a DFRE to dynamically select and deploy heuristic packages, it is to be understood that various other adaptations and modifications may be made within the spirit and scope of the embodiments herein. For example, while certain embodiments are described herein with respect to using the DFRE to assess specific subservice options, these options are exemplary only and one skilled in the art would easily recognize that the teachings herein can be adapted to evaluate a plethora of other subservice options, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
  receiving, at a deep fusion reasoning engine, network telemetry data collected from a network, wherein the deep fusion reasoning engine is initiated with a seed ontology to populate a knowledge base of the deep fusion reasoning engine;
  learning, by the deep fusion reasoning engine, resource utilizations for different heuristic packages that can be used in the network to evaluate operation of the network;
  selecting, by the deep fusion reasoning engine, one of the heuristic packages based on the resource utilizations learned for the different heuristic packages, wherein the selected heuristic package comprises a subservice and a set of rules to be evaluated; and
  deploying, by the deep fusion reasoning engine, the selected heuristic package for execution by a device in the network to evaluate operation of the network using the set of rules.

2. The method as in claim 1, further comprising:
  repeating, by the deep fusion reasoning engine, the receiving, learning, selecting, and deploying steps as part of a closed-loop control mechanism.

3. The method as in claim 1, wherein the deep fusion reasoning engine uses assumption of insufficient knowledge and resources (AIKR)-based semantic reasoning to select the heuristic package based on the learned resource utilizations.

4. The method as in claim 1, wherein the different heuristic packages represent different approaches to monitoring a particular characteristic of the network.

5. The method as in claim 1, wherein the deep fusion reasoning engine selects the heuristic package based further in part on a number of devices to which the heuristic package should be deployed.

6. The method as in claim 1, wherein the heuristic package causes the device to establish one or more probing sessions along a path in the network using a monitoring protocol specified by that heuristic package.

7. The method as in claim 1, further comprising:
  deploying, by the deep fusion reasoning engine, the selected heuristic package to a selected plurality of devices in the network to evaluate operation of the network using the set of rules.

8. The method as in claim 1, wherein the deep fusion reasoning engine selects the heuristic package based further in part on a configuration complexity or monitoring complexity associated with the selected heuristic package.

9. An apparatus, comprising:
  one or more network interfaces to communicate with a network;
  a processor coupled to the network interfaces and configured to execute one or more processes; and
  a memory configured to store a process executable by the processor, the process when executed configured to:
    receive, at a deep fusion reasoning engine of the apparatus, network telemetry data collected from a network, wherein the deep fusion reasoning engine is initiated with a seed ontology to populate a knowledge base of the deep fusion reasoning engine;
    learn, by the deep fusion reasoning engine, resource utilizations for different heuristic packages that can be used in the network to evaluate operation of the network;
    select, by the deep fusion reasoning engine, one of the heuristic packages based on the resource utilizations learned for the different heuristic packages, wherein the selected heuristic package comprises a subservice and a set of rules to be evaluated; and
    deploy, by the deep fusion reasoning engine, the selected heuristic package for execution by a device in the network to evaluate operation of the network using the set of rules.

10. The apparatus as in claim 9, wherein the deep fusion reasoning engine uses assumption of insufficient knowledge and resources (AIKR)-based semantic reasoning to select the heuristic package based on the learned resource utilizations.

11. The apparatus as in claim 9, wherein the different heuristic packages represent different approaches to monitoring a particular characteristic of the network.

12. The apparatus as in claim 9, wherein the deep fusion reasoning engine selects the heuristic package based further in part on a number of devices to which the heuristic package should be deployed.

13. The apparatus as in claim 9, wherein the heuristic package causes the device to establish one or more probing sessions along a path in the network using a monitoring protocol specified by that heuristic package.

14. The apparatus as in claim 9, wherein the process when executed is further configured to:
  deploy, by the deep fusion reasoning engine, the selected heuristic package to a selected plurality of devices in the network to evaluate operation of the network using the set of rules.

15. The apparatus as in claim 9, wherein the device is a router in the network.

16. A tangible, non-transitory, computer-readable medium storing program instructions that cause a deep fusion reasoning engine to execute a process comprising:

receiving, at the deep fusion reasoning engine, network telemetry data collected from a network, wherein the deep fusion reasoning engine is initiated with a seed ontology to populate a knowledge base of the deep fusion reasoning engine;

learning, by the deep fusion reasoning engine, resource utilizations for different heuristic packages that can be used in the network to evaluate operation of the network;

selecting, by the deep fusion reasoning engine, one of the heuristic packages based on the resource utilizations learned for the different heuristic packages, wherein the selected heuristic package comprises a subservice and a set of rules to be evaluated; and deploying, by the deep fusion reasoning engine, the selected heuristic package for execution by a device in the network to evaluate operation of the network using the set of rules.

17. The computer-readable medium as in claim 16, wherein the process further comprises:

repeating, by the deep fusion reasoning engine, the receiving, learning, selecting, and deploying steps as part of a closed-loop control mechanism.

18. The computer-readable medium as in claim 16, wherein the deep fusion reasoning engine uses assumption of insufficient knowledge and resources (AIKR)-based semantic reasoning to select the heuristic package based on the learned resource utilizations.

* * * * *

UNITED STATES PATENT AND TRADEMARK OFFICE
CERTIFICATE OF CORRECTION

PATENT NO. : 11,687,798 B2
APPLICATION NO. : 16/811823
DATED : June 27, 2023
INVENTOR(S) : Hugo Latapie et al.

Page 1 of 1

It is certified that error appears in the above-identified patent and that said Letters Patent is hereby corrected as shown below:

In the Specification

Column 12, Line 37, please amend as shown:
The amount of configuration needed to implement the subservice option Signed and Sealed this
Twenty-sixth Day of September, 2023

Katherine Kelly Vidal
*Director of the United States Patent and Trademark Office*